July 19, 1938.　　　F. L. O. WADSWORTH　　　2,124,092
METHOD AND APPARATUS FOR FEEDING THERMOPLASTIC MATERIAL
Filed March 27, 1935　　2 Sheets—Sheet 1
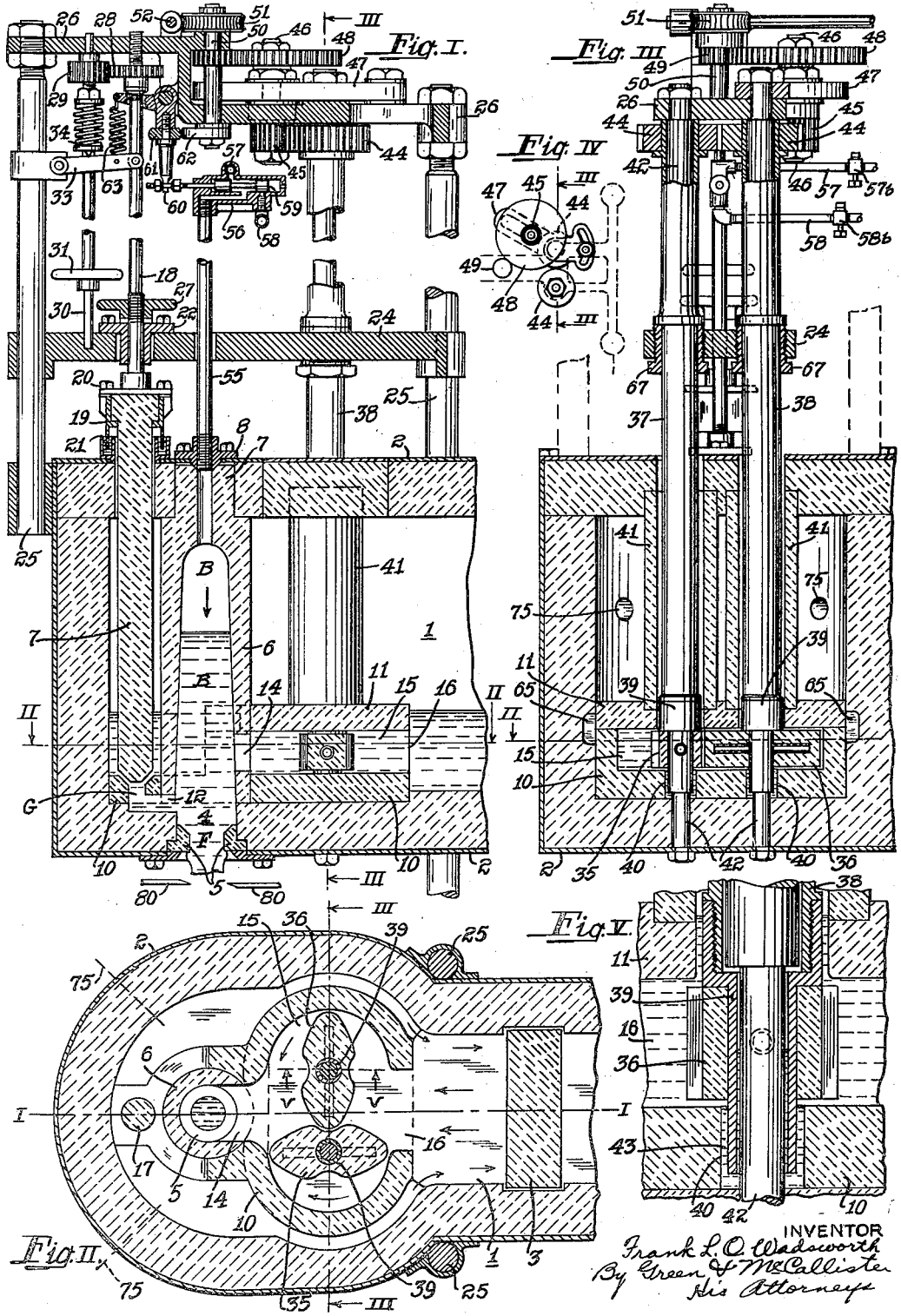

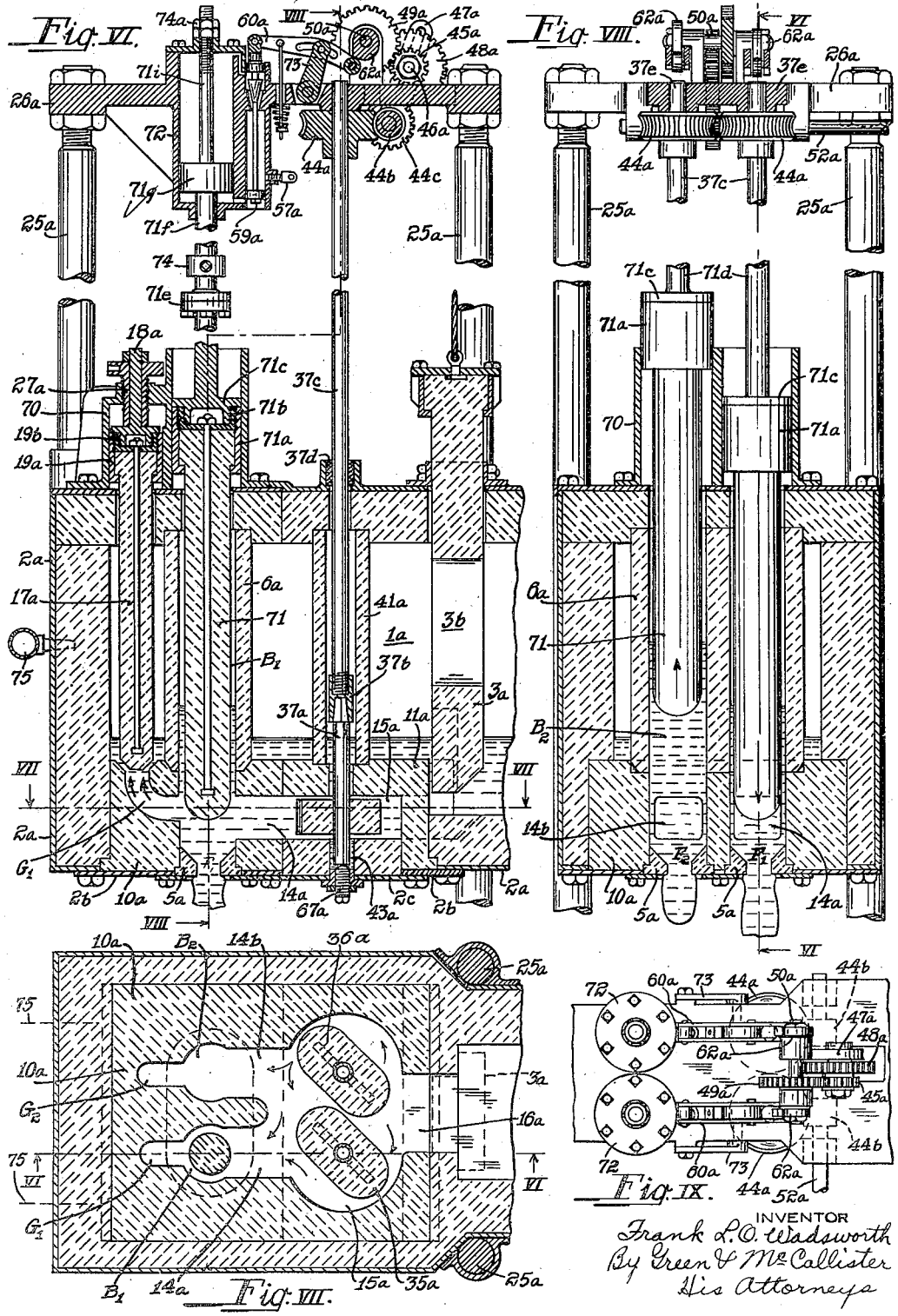

Patented July 19, 1938

2,124,092

UNITED STATES PATENT OFFICE 2,124,092

METHOD AND APPARATUS FOR FEEDING THERMOPLASTIC MATERIAL

Frank L. O. Wadsworth, Pittsburgh, Pa., assignor to Ball Brothers Company, Muncie, Ind., a corporation of Indiana Application March 27, 1935, Serial No. 13,268

25 Claims. (Cl. 49—55)

My invention relates to the art of feeding thermo plastic material, such as molten glass, in a continuously flowing stream of periodically varied cross section; and it is particularly directed to a new principle of operation in which the glass in and above the delivery orifice of the feeder is continuously subjected to an externally imposed force that always assists and supplements the action of gravity in expelling the molten material therefrom.

A feeder operating on this principle, may be broadly designated as a continuous forced flow feeder, as distinguished both from a natural flow feeder—in which the only force acting to expel the glass from the discharge opening is gravity—and from the usual types of forced flow feeders in which the glass adjacent to the delivery orifice is alternately subjected to reversed resultants of force that act successively to accelerate and arrest, or even retract, the outflow. Feeders of the last mentioned character are also known as "suspended gob" feeders because successively formed portions of the material which have been ejected from the delivery orifice under the expulsion forces, are at times suspended or held stationary, or even drawn backward toward the orifice under the action of the retractive forces.

One object of my invention is not only to entirely eliminate these successive stoppages and/or reversals of outflow from the delivery orifice, and thus not only avoid the loss of time and the corresponding decrease in the average rate of delivery that result from such stoppage or such retractive actions, but also to materially decrease or minimize any changes of temperature (e. g. cooling), or any variations in the physical homogeneity of the extruded masses of glass occasioned by these periods of inactivity. Stated in more general terms, the object of my invention is to substantially increase the speed and the efficiency of the feeding operation, and the quality of the mold charges produced.

Another object of the present invention is to provide a feeder which will establish and maintain a continuous forced circulatory movement of the glass in immediate proximity to the delivery orifice, and also in the reservoir or chamber from which the glass is supplied, for the purpose of rapidly equalizing any temperature or compositional variations therein, and thus avoiding an unsymmetrical extrusion or expulsive action on the outflowing viscous material.

A further object is to provide a feeding mechanism which is capable of concurrently delivering either one, or two, or more, continuously flowing streams of glass, which may be cooperatively or independently controlled—both as to the average rate, and as to periodic variations in the volume of the flow—so as to obtain either one or more regularly recurrent series of extruded stream sections that are suitable for severance into independent mold charges.

Still another object of this invention is to produce a feeder of the type above described which is adapted to be readily adjusted and controlled, while it is in continuous operation, in such manner as to obtain relatively wide variations, both in the weight or size, and in the shape or contour, of the successively formed and severed mold charges. More specifically stated, this last mentioned object is, (1) to produce means for varying and regulating the magnitude of one externally applied force for the purpose of changing the mean or average rate of discharge of the continuously flowing glass stream; (2) to provide other means for periodically altering the magnitude of another externally applied force for the purpose of alternately increasing and decreasing the diameter of the said stream; and (3) to provide still another means for diverting a regulatable amount of glass away from the delivery orifice (and returning it to the main source of supply) for the purpose of further varying the composite effect of the extrusion forces and correspondingly regulating the resultant discharge of molten glass from the delivery orifice.

An additional purpose of my present improvements is to provide a continuously acting positive pump which is adapted to operate effectively in molten glass and to deliver a predetermined volume of this material, under a substantially constant pressure (head), to the outlet chamber of the feeder assembly; and which can be readily controlled to vary both the rate and the pressure of such delivery.

Still another object of these improvements is an arrangement of operative parts which will permit any or all such parts as are in contact with the molten glass to be readily removed, and replaced, without disassembling or disturbing other parts of the apparatus.

Other features of my present invention will be made apparent by a more detailed consideration of two exemplary embodiments thereof, that are illustrated in the accompanying drawings, in which:

Figure I is a sectional elevation, on a central plane (i. e., the plane I—I of Fig. II) through the longitudinal axes of the feeder;

Fig. II is a horizontal section on the plane II—II of Fig. I;

Fig. III is a sectional elevation on the plane III—III of Figs. I and II;

Fig. IV is a semi-diagrammatic plan view of a portion of the mechanism shown in Figs. I, II and III;

Fig. V is an enlarged fragmental sectional view on the plane V—V of Fig. II;

Fig. VI is a sectional elevation (on the plane VI—VI of Fig. VII) of a second exemplification of my invention;

Fig. VII is a horizontal section on the plane VII—VII of Fig. VI;

Fig. VIII is a sectional elevation on the double plane VIII—VIII of Fig. VI; and Fig. IX is a general plan view of the main parts of this second illustrative construction.

In the construction shown in Figs. I to V inclusive, the body of molten glass forming the source of the continuously flowing stream is contained in a forehearth chamber 1, which is connected to the front or "fining" end of a large melting tank or furnace (not shown) and which is enclosed by a suitable frame or "boot" that is preferably made up of an outer wall of highly polished sheet metal 2, (having a low coefficient of thermal radiation), and a thick non-metallic lining of refractory heat insulating material. This forehearth is provided with a vertically movable "baffle" block 3, which serves both as a "skimmer" for the glass flowing from the melting tank to the forehearth, and (when lowered into effective contact with the forehearth floor) also serves as a "cut off" gate which will permit all of the molten material to be drained away from the front portion of the chamber 1.

The floor of the forehearth is provided with a submerged discharge opening 4, whose outer end is partially closed by a removable bushing 5— which defines the size and shape of the delivery orifice F—and whose upper, or inner end is in registry with the bore of a tubular sleeve 6, that extends from the floor to the roof of the forehearth chamber 1 and is provided with a reduced neck 7 which passes through the superimposed roof block and is engaged by a flanged collar 8 that is bolted to the enclosing sheet metal wall 2.

The lower end of the sleeve 6 is engaged with an opening in the bottom wall of an oval cup shaped member 10 which rests on the floor of the forehearth chamber, and is also engaged, on one side, by a semi-cylindrical recess in a cover block 11, which rests on the upper edge of the side wall of the member 10. The bottom edge of the sleeve (6) is cut away, on one side, to form a port opening 12, which is in registry with a passageway G in the front end of the member 10; and the opposite side of this sleeve is provided with a larger opening 14, which opens into the oval chamber 15 between the side wall of this member (10) and the cover block 11, and which is in horizontal alignment with a still larger opening 16 that connects this chamber (15) with the main forehearth chamber 1 and forms an inlet port through which glass in the surrounding forehearth enters the chamber 15.

The upper flared end of the passageway G is partially closed (viz. controlled) by a vertically movable plug 17, which projects upwardly through the roof of the forehearth chamber and is clamped to the lower flanged end of a vertical shaft 18, by means of the coupling sleeve 19 and the bolt 20. In order to prevent any escape of gases from the forehearth chamber—around the movable plug—the sleeve 19 is provided with a depending skirt that dips into a body of fusible metal (e. g. a suitable lead or zinc alloy) which is contained in an annular cup 21, supported on the forehearth roof plate (2). The shaft 18 passes through a flanged guide collar 22, which is secured to a T-shaped frame 24 that is adjustably supported on the forehearth boot by the three vertical posts 25—25—25; and is extended upwardly through a second guide bearing on another overhead frame 26 that is also adjustably mounted on these posts. The lower portion of the shaft (18) is threaded to receive a hand wheel nut 27, which is adapted to engage the end of the guide collar 22 and thus limit the downward movement of the plug 17 toward the flared end of the passageway G. The upper end of the shaft is also threaded to engage the hub of a gear nut 28, which may be revolved, and thus moved up and down on the shaft, by means of the pinion shaft and hand wheel connections 29—30—31. The shaft 18 is prevented from turning in its guide bearings by its pivotal connection with the end of a twin arm lever 33, which is rockably supported on the adjacent post 25; and the associated members 17—18—19—27—28 and 33 are normally held in their lowermost position (as determined by the setting of the wheel nut 27) by the cooperative action of gravity and of a compression spring 34, which is interposed between the lever 33 and an adjustable nut on the shaft 30.

The oval chamber 15—between the bounding walls of the cup and cover members 10 and 11— encloses the impeller of a rotary pump which, as here shown, comprises two cycloidal like impellers 35—36, that are secured to the lower ends of the tubular shafts 37—38, by means of the threaded couplings 39, which are embedded in, and keyed to, the refractory impeller bodies, and which extend downwardly into openings 40 in the bottom wall of the member 10 (see Figs. III and V). The projecting portions of these couplings are necessarily in contact with the molten glass in the pump chamber; and they are therefore preferably formed of metal, which has a high heat resistivity (e. g. a chromium-nickel or a manganese-chromium-nickel steel alloy) and which is also surface treated to withstand the corrosive action silicates.

The portions of the tubular shafts 37—38 which extend upwardly from the couplings 39, through the forehearth roof, are surrounded and protected by thick sleeves 41, of refractory and heat insulating material, whose ends are seated in recesses on the upper surface of the cover block 11, and on the lower face of the forehearth roof, and which serve to not only hold the pump chamber members 10—11 in position on the forehearth floor, but also prevent any escape of the forehearth gases through the roof openings around the enclosed shaft elements.

The tubular shafts 37 and 38 are rotatably mounted on stationary journal supports 42—42, whose upper ends are clamped in the overhead frame 26, and whose lower ends are passed through and secured in, the bottom plate of the forehearth boot 2. In order to prevent the molten glass in the pump chamber 15 from coming in contact with these journals—and to further protect the adjacent portion of the impeller couplings 39—the openings 40 in the lower wall of the block 10, are filled with a mass 43 of fusible metal (see Fig. V), which will also serve as a liquid lubricant for the relatively moving elements 39—41.

The upper ends of the impeller shafts 37—38 are keyed to intermeshed spur gears 44—44, and are driven in unison by a pinion 45, which is detachably secured to the lower end of a short transmission shaft 46, that is rotatably mounted in a radially adjustable bearing block on the angularly adjustable arm 47. The upper end of the shaft 46 carries a gear 48, which is engaged by a pinion 49 on a second transmission shaft 50, that is journaled in suitable bearings on the frame 26; and this shaft (50) is driven by any suitable motor through the agency of the worm wheel and worm elements 51—52. The purpose of using this train of transmission elements 45—46—48—49—51—52 is to not only obtain the desired speed reduction between the motor shaft and the impeller shafts—which must be revolved at a relatively low velocity—but to also afford a ready means of altering this ratio;—this last result being accomplished by changing the size of either or both of the gears 45 and 48; and correspondingly readjusting the position of the bearing support for the transmission shaft 46.

The upper end of the hollow sleeve 6 is in direct communication with a pipe 55, whose lower end is threaded into the flanged cap 8, and whose upper end is coupled to a valve casing 56 which is in turn connected to two conduits 57 and 58 that lead respectively to suitable sources of substantially constant super-atmospheric and sub-atmospheric pressures. The casing 56 contains a reciprocable double piston valve 59 whose stem is adjustably coupled to the lower arm of a bell crank lever 60 which is pivotally mounted on the vertical frame 26 and which carries a cam roller 61, that is held in operative engagement with a cam 62, on the shaft 50 by means of a spring 63. The upper arm of the bell crank lever 60 is perforated to receive the shaft 18 and is adapted to engage the lower rounded end of the downwardly projecting hub of the gear 28.

The operation of the above described organization is as follows:

The constantly revolving pump impellers 35 and 36 draw the glass from the forehearth chamber through the inlet opening 16, and continuously impel it forward, through the opening 14 into the sleeve chamber B, under a pressure which is dependent upon the speed of rotation of the shafts 37 and 38. The constant pressure thus exerted on the forwardly flowing stream of molten glass acts both to accelerate the discharge from the submerged delivery orifice F, and also to raise the level of the superimposed column of material in the chamber B above that of the parent body of glass in the surrounding forehearth;—this difference of level corresponding to the kinetic differences of pressure on the glass at the inlet port 14 and at the surface of the said column.

In the position of the parts shown in Fig. I, the fluid or air pressure above the glass in the interior of the sleeve 6 has been increased above that of the external air by the movement of the valve 59 to the left, and the resultant establishment of a communication between the conduit 57 and the pipe 55. This increase of pressure in the upper end of the chamber B opposes the upward movement of the glass therein, and correspondingly accelerates the downward discharge of the material through the delivery orifice F; and the consequent enlargement of the outflowing stream. As the operation continues the rotation of the valve control cam 62 permits the valve 59 to be moved to the right, by the action of the spring 63, thus cutting off the connection between the conduit 57 and the pipe 55, and establishing a connection between that pipe and the vacuum (sub-atmospheric pressure) conduit 58. Under these conditions, a larger part of the pressure at the outlet opening of the pump—i. e. at the sleeve port 14—becomes effective in producing an upward movement of the glass in the chamber B, and there is a corresponding decrease in the forced discharge from the delivery orifice F; thus producing a natural "necking" or momentary reduction of diameter of the continuously flowing stream. Immediately thereafter the cam 62 again acts to move the valve 59 to the left, thus completing one cycle of the feeding operation.

The above described cooperative effect of the constantly acting pressure pump elements (35 and 36) and of the alternately applied super-atmospheric and sub-atmospheric pressures (as controlled by the action of the valve 59) may be modified, if desired, by a periodic and synchronous movement of the by-pass plug valve 17, which serves to control the flow of molten material through the passageway G, and thus effect, to some degree, the extrusion pressure on the glass in and above the delivery orifice F. When the cam 62 acts to move the valve 59 to the left the horizontal arm of the bell crank lever 60 is lifted; and the plug valve 17 will be correspondingly moved upward by an amount which is determined by the manual setting of the gear wheel nut 28 on the valve rod 18. When this movement occurs, the effective area of the by-pass passage G is increased, and a portion of the glass in the chamber B will be discharged back into the front end of the main forehearth, from which it may pass rearwardly—through the channels 65—65, in the side walls of the forehearth chamber—to points adjacent the pump inlet opening 16 (see Figs. II and III). When the bell crank lever 60 is rocked, in a counter-clockwise direction—(to move the valve 59 to the right and connect the top of the chamber B with the vacuum conduit 58)—the plug valve 17 is permitted to move downward until the hand wheel nut 27 engages the end of the guide bushing 19 and the passageway G is thus throttled or restricted, to any desired degree, so that substantially the full inflow pressure in the sleeve opening 14 becomes available in forcing the glass into the delivery chamber B and the only material outflow therefrom is through the delivery orifice F.

It will be apparent that the manual adjustment of the gear nut 28 and of the hand wheel nut 27—and the corresponding regulation of the up and down movements of the valve member 17—provides a means for readily varying the cooperative action of the several forces which activate and control the periodically varied rate of discharge of the continuously flowing stream of glass; but it will also be understood that the above described feeder organization may be operated with a fixed setting of the by-pass valve plug (17), by merely moving the gear nut 28 up out of the range of movement of the oscillating lever 60. It will be further apparent that the phase relationship between the variations in pneumatic pressure in the delivery chamber B, and the movements of the valve plug 17, may, if desired, be readily reversed by interchanging the conduit connections 57 and 58.

It will be apparent that under normal operating conditions, the pump elements (35—36) will operate to force glass into the chamber B and to raise the level of that glass above that of the main body in chamber 1, even though the fluid pressure within the chamber B—above the glass—is not reduced below atmospheric pressure; and that such air as is trapped above the glass in chamber B will be increased in pressure as the column of glass rises in that chamber, until a balance is reached between the pressure generated by the pump elements, effective within the chamber B, and the pressure of the trapped air. The height to which glass will be raised in chamber B will, under such conditions, depend upon the pressure at the outlet of the pump, the area of the orifice F and the effective outlet area of the passage G, but in any event, the periodic variation of the forces acting on the glass at the orifice may be obtained without the necessity of periodically reducing the air pressure above the glass in chamber B below atmospheric pressure. I, however, prefer to employ apparatus, such as above described for periodically reducing the air pressure within chamber B, since this speeds the operation of accumulating glass in that chamber and thus decreases the time necessary for completing each feed cycle.

In Figs. VI to IX inclusive, I have illustrated another form, or exemplification of my present invention. In this exemplification the "shut off" gate (3a), which controls the flow of glass to the front end of the forehearth chamber (1a), is positioned behind—and with its lower rabbeted end partially within—the pump inlet opening 16a; and it is therefore adapted to serve not only as a "cut off" and "skinner" block, but also as an adjustable throttle valve control of the stream of glass that is drawn forward by the continuously revolving pump impellers 35a and 36a. The form of these impellers is also slightly different from that shown in Fig. II; and, in the construction, each of these members is mounted on a short journal shaft 37a, which is made of some highly refractory and not readily corrodible metal alloy, and which is embedded in and keyed to the body of the impeller blade. The connected members, 35a—37a, 36a—37a, are rotatably supported on adjustable end thrust screws 67a, which are carried by a detachable plate 2c that is bolted against the bottom wall (2a—2b) of the forehearth boot, and whose inner ends are preferably immersed in and protected by a surrounding mass (43a) of fusible metal.

The upper ends of the pump shafts (37a) are provided with squared and tapered shanks which are adapted to enter correspondingly shaped socket couplings 37b at the lower extremities of the shafts 37c; and these connected elements are surrounded, and protected from the action of the forehearth gases, by heat insulating sleeves 41a, which are interposed between the top cover block (11a) of the pump chamber (15a) and the forehearth roof, and which perform the same functions as the correspondingly numbered members of the first described construction. The shafts 37c project upwardly, through graphite guide bearings 37d on the roof of the forehearth boot, and other bearings 37e on an overhead frame 26a that is adjustably mounted on the vertical posts 25a—25a—25a; and are keyed, at their upper ends to a pair of right and left hand worm wheels 44a—44a which are driven in unison—at the same speed but in opposite directions—by a pair of worms 44b—44b on the variable speed motor shaft 52a. This motor shaft is also connected to a horizontal cam shaft 50a, by a train of reduction gearing, which comprises the motor shaft pinion 44c, the cam shaft gear 49a, and the intermediate transmission assembly of "change gear" elements 45a—46a—47a and 48a, and which is adapted to drive the cam shaft (50a) at any desired and predetermined speed with relation to that of the pump impeller shafts 37c—37c.

In the construction now being described the block 10a, which contains the pump chamber 15a, itself forms a portion of the main forehearth floor, and is removably supported in the enclosing boot 2a by a plate 2b that is bolted to the lower wall thereof. This removable block is provided with two cylindrical openings, or chambers B1, B2, which are connected to the pump chamber 15a by the pump outlet ports 14a—14b, and which are partially closed, at their lower ends by annular bushings 5a—5a that define the size and shape of the delivery orifices F1, F2. The upper face of the block is provided with an oval coned recess that is adapted to engage the correspondingly beveled end of a sleeve block 6a, which extends upwardly to the forehearth roof, and which contains two cylindrical openings that are in alignment with, and form extensions of, the delivery chambers B1, B2 in the block 10a. These chambers are also connected to the front end of the forehearth by the passageways G1, G2, each of which, like the passage G, constitutes a by-pass for the associated delivery or accumulation chamber B.

The outer ends of the passages G1, G2 are controlled by vertically adjustable plug valves 17a, which pass upwardly through the forehearth roof, and are rigidly engaged at their upper ends by flanged sleeve couplings and cap connections 19a—19b which are slidably mounted in a cylinder block 70 on the forehearth frame 2a. Each of the caps 19b is attached to a short shaft 18a which is rotatably engaged by a capstan head sleeve bolt 27a that is threaded through the upper wall of the block 70; and by turning this bolt the connected shaft and valve members 18a—19a—17a may be raised or lowered to vary the effective area of the associated passageway G.

A vertically reciprocable plunger 71 is axially mounted in each of the chambers (B1 or B2), which are formed by the aligned openings in the blocks 6a and 10a, and projects upwardly through the forehearth roof, to receive the flanged sleeve and cap members 71a—71b, that slide up and down in a cylindrical guideway in the block 70. Each of the caps 71b is detachably secured to a flanged head 71c, at the lower end of a shaft 71d, which is in turn connected, by a flange coupling 71e, to the piston rod 71f, of the piston-cylinder assembly, 71g—72, that is carried by the overhead frame 26a.

Each end of each cylinder (72) is alternately put into communication with the atmosphere and with a pipe 57a that leads to a suitable source of motive fluid, by the up and down movement of a double acting needle-piston valve 59a, whose stem is operatively connected with a cam 62a, on the shaft 50a, by the twin arm links 60a—60a. These link elements are rockably supported on a fulcrum pin at the upper end of a ball crank lever 73, which is mounted on the frame 26a, and which may be angularly adjusted thereon so to vary the position of the fulcrum pin in the slotted arms of the link connection 60a, and thereby alter the stroke of the valve 59a. The range of movement of each piston member (71g) in its cylinder (72) is controlled by an adjustable collar 74 on the piston end 71f, and by adjustable lock nuts 74a on the piston rod extension 71i.

The two cams 62a—62a which actuate the twin valve assemblies 59a—60a—73 etc. are preferably so adjusted on the shaft 50a that the associated plunger-piston-rod members 71—71f—71g etc. are alternately reciprocated in opposite directions—i. e., in such manner that one set of members is moving up, while the other set is moving down (as indicated by arrows in Fig. VIII)—but they may of course be so set that there is any desired phase relationship between the movements of these parts. It should, however, be understood that, as respects the general mode of operation of the last described organization—in establishing and maintaining a continuous but periodically varied discharge of glass flow, one or the other of the twin delivery orifices F1, or F2—it is immaterial as to whether the plungers 71—71 are raised and depressed alternately or concurrently. This mode of operation is essentially the same as that of the construction shown in Figs. I to V inclusive and is as follows:—

The constantly revolving pump impellers 35a—36a, induce a continuous forward flow of glass through the pump chamber 15a and the discharge outlets 14a—14a, into the lower ends of the delivery chambers B1 and B2. The molten material, which is thus continuously supplied to these chambers—under a pressure which is regulated and determined by the speed of rotation of the shafts 37c—is expelled from the delivery orifices F1 and F2 at a rate which is controlled in part by the manual adjustment of the by-pass valve plug 17a (which restricts the return flow through the passages G1 and G2), but which is periodically increased and decreased by the supplemental forces imposed on the glass in the delivery chambers by the downward and upward movements of the plunger members 71—71. These supplemental forces are of the same general character as those exerted by the successively applied superatmospheric and subatmospheric pressures on the surface of glass in the chamber B of the first described embodiment of my invention; i. e., the downward movement of the plunger imposes an additional supplemental force, which cooperates with the pump induced pressure in the chamber supply port 14a, in accelerating the discharge of glass from the associated delivery orifice F1 (or F2)— and correspondingly increasing the diameter of the outflowing stream of material—and the reverse upward movement of the plunger permits a part of the pressure exerted by the pump to become effective in forcing the molten glass into the space left by the rising plunger (and incidentally assisting its upward movement) and raising the level of the material in the plunger chamber. This last described action will of course temporarily diminish the rate of discharge from the delivery outlet that is below the rising plunger and will result in a natural "necking", or decrease in diameter, of the continuously flowing stream, which will facilitate the severance of the stream into a series of mold charges of the desired shape and weight.

The volume and the contour of the successively formed stream sections (between the "necked" portions thereof) can be readily varied, while the feeder is in continuous operation; first, by varying the speed of the motor driven shaft 52a (or 52) by means of a suitable rheostat, so as to increase or decrease the primary delivery pressure of the rotary pump elements 35a—36a (or 35—36); second, by the manual adjustment of the position and/or the range or movement of the by-pass valve plug 17a (or 17), by means of the threaded members 27a (or 27 and 28); and third, by controlling the degree and rate of application of the supplemental pressures on the glass in the delivery chambers B1, B2 (or B). In the construction shown in Figs. I to V inclusive, the control of these supplemental pressure applications may be effected by the use of manually adjustable throttle or pressure reducing valves 57b—58b in the conduits 57 and 58; in the construction shown in Figs. VI to IX inclusive, this control can be effected first, by the use of a similar valve in the conduit 57a; second by the adjustment of the degree of opening of the needle-piston valves 59a—which will vary the rate of flow of motive fluid to the plunger cylinders 72—by means of the movable fulcrum pin lever supports 73; and third, by shifting the setting of the stop members 74 and 74a on the piston rod elements 71f and 71i and thus altering the stroke of the assembled plunger 6a. It will be noted that in the case of the twin orifice feeder organization last described the two last mentioned means of control are independently applicable to the masses of glass in the two delivery chambers B1 and B2—thereby permitting the outflow from the two delivery orifices F1 and F2 to be repeatedly varied and regulated—and that, in this construction, the action of the pump can be further controlled by raising or lowering the gate 3a, at the pump inlet opening 16a.

It will also be apparent that the rate of outflow from the delivery orifice (or orifices) of my improved feeder may be further varied within wide limits, by changing the bushings 5 and 5a, or by changing the relative speeds of rotation of the pump and cam shafts (37 and 50 or 37a and 50a) by means of the change gear assemblies 45—46—47—48—49 (or 44a to 49a inclusive); or by changing the cams 62 or 62a—(either of which may be readily removed from the end of its shaft support 50 or 50a)—but these changes can only be made by interrupting the continuous operation of the feeder.

Suitable provision is made for heating the forehearth chambers 1 or 1a (e. g., by means of burners such as are shown or indicated at 75—75 etc. in Figs. II, III, VI and VII)—to any desired temperature, and for permitting the escape of gases therefrom to the main furnace chamber (e. g. through opening 3b in the gate or baffle block members 3 and 3a). The regulation of the temperature of the parent body of glass in the forehearth affords a further means of varying the rate of outflow of the hot viscous material from the delievery orifices; and the continued agitation of the outflowing glass by the constantly revolving pump impellers—and by the return currents from the by-pass passages G, G1, G2 to the pump inlet opening 16 (16a)—rapidly equalize, or eliminate, any differences in temperature or in the physical homogeneity of the molten material.

In Fig. I, I have diagrammatically illustrated shear blades 80—80 located below, but adjacent to the orifice F. Structural details of effective severing mechanisms are well known in the art, therefore it seems unnecessary to do more than indicate the intent to employ such a mechanism which operates in synchronism with the periodic application of the stream forming forces above described and which acts to sever the stream issuing from the orifice into separate mold charges and thus complete the formation of each charge while the next successive charge is in the process of formation.

This severance will preferably be accomplished while the charge, to be severed, is unsupported, except by the orifice and it will, of course, be apparent that a severing mechanism, such as above referred to, will be employed in connection with the multiple orifice feeder, an embodiment of which is disclosed by Figs. VI—IX. It will be understood that a severing mechanism such as shown in my application Ser. No. 730,935 filed June 16, 1934, may be employed for the purpose of obtaining the advantages gained by projecting each severed charge at a high velocity into either a moving or stationary mold.

With the preceding disclosure as a guide, those skilled in this art will understand and appreciate the characteristic features and advantages of my present invention; and will be enabled to design and construct various other forms of apparatus which will embody in whole or in part the heretofore described principles of operation and procedure, and which will thereby achieve the objects and purposes of these improvements. I do not therefore limit myself, except by my claims, to any specific forms of construction, such as have been here presented as adapted to the practice of my improved method of feeding molten glass, or to the exact procedure hereinbefore disclosed; since it will be apparent that many detail changes, both in the apparatus and in the functional actions and cooperative relationships of the various parts, may be made without departing from the spirit of my invention or the scope of the appended claims.

What I claim as new and desire to secure by Letters Patent is:—

1. A method of feeding plastic material, such as molten glass, in the form of a succession of shaped mold charges, which consists in creating a continuous forced flow of such material toward and through a material submerged, continuously open flow orifice, periodically diverting a portion of such flow and accumulating a mass of such material above such orifice, periodically augmenting the flow through such orifice by forcing material from such mass toward such orifice, regulating the resultant flow through the orifice by diverting a portion of the glass away from the orifice, and cutting the stream issuing from the orifice during each period of reduced flow and at a point below but adjacent such orifice.

2. A method of feeding plastic material such as molten glass in the form of a succession of separate mold charges, which consists in continuously delivering a forced flow of such material to a confining passage having a delivery orifice to create a continuous flow of such material through said orifice, periodically diverting a portion of such flow and accumulating a portion of such material traversing such passage, severing the stream of material issuing from said orifice, expelling the accumulated material through said orifice to increase the flow therethrough and periodically by-passing a portion of the resultant flow away from said orifice to control the flow therethrough.

3. A method of feeding plastic material such as molten glass in the form of a succession of separately formed mold charges, which consists in creating a continuous forced flow of such material in the form of a stream under pressure, dividing such stream for delivery through two flow orifices, alternately accumulating material from each such stream in the form of a separate mass and expelling material from each such mass to augment the flow through each such orifice, by-passing a portion of the resultant flow away each orifice to control the flow through each orifice and severing each stream issuing from each such orifice during periods of reduced flow therethrough.

4. A feeder for material such as molten glass, comprising a source of such material, a passage having a delivery orifice communicating therewith, a continuously operating pump adapted to deliver material from said source under pressure to said passage, an accumulation chamber communicating with said passage, means for periodically reducing the fluid pressure within said chamber to augment the movement of material from said passage into said chamber, periodically acting means for expelling material from said passage back into said source, and means for severing the stream of material issuing from said orifice.

5. A feeder for material such as molten glass, comprising a source of such material, a passage having a delivery orifice formed therein, a pump between said source and said passage, alternately acting means for drawing material from said passage and expelling material back into said source, and means for periodically severing the stream of material issuing from said orifice.

6. A feeder for material such as molten glass, comprising a source of such material, a passage having a delivery orifice formed therein, a pump between said source and said passage, alternately acting means for drawing material from and expelling it back into said passage, means for periodically severing the stream of material issuing from said orifice, a vent port communicating with said passage and means for controlling said port to vary the pressure of the material within said passage.

7. A feeder for material such as molten glass, comprising a source of such material, a passage having a delivery orifice therein and a discharge port leading therefrom, a pump for delivering material from said source under pressure to said passage, a chamber communicating with said passage, means for alternately subjecting the interior of said chamber to sub and superatmospheric pressure, and a valve like element for controlling said discharge port to control the pressure of said material in said passage.

8. A feeder for material such as molten glass, comprising a source of such material, a passage having a delivery orifice therein and a discharge port leading therefrom, a pump for delivering material from said source under pressure to said passage, a chamber communicating with said passage, means for alternately subjecting the interior of said chamber to sub and superatmospheric pressure, and a reciprocable valve for controlling said port, and means for periodically reciprocating said valve to create a pulsating pressure within said passage.

9. A feeder for plastic material such as molten glass, comprising a source of such material, a passage having a material delivery orifice therein, and a vent port leading therefrom back to said source, a chamber communicating with said passage adapted to receive material therefrom, periodically acting means for expelling material from said chamber back into said passage, and a periodically acting valve to control said port.

10. A feeder for plastic material such as molten glass, comprising a source of such material, a confined passage having a material delivery orifice communicating therewith, a vent port leading from said passage back to said source, a continuously acting pump for receiving material from said source and delivering it under substantially increased pressure to said passage, and periodically acting means for varying the area of said vent port and the effective pump pressure within said passage.

11. A feeder for plastic material such as molten glass, comprising a source of such material, a passage having a material delivery orifice communicating therewith, a continuously acting pump for receiving material from said source and delivering it under pressure to said passage, means communicating with said passage for occasioning pulsations of pressure within said passage, and a vertically adjustable skimmer block for controlling the stream of glass drawn into said passage by said pump.

12. A feeder for plastic material such as molten glass comprising a source of such material, a passage having two material delivery orifices, a pump for delivering material from said source under substantial pressure to said passage, a plurality of chambers communicating with said passage, means for alternately expelling material from said chambers into said passage.

13. A feeder for plastic material such as molten glass comprising a source of such material, a passage having a material delivery orifice, a continuously acting pump between said source and said passage, a chamber communicating with said passage, a plunger within said chamber and aligned with said orifice, a vent port leading from said passage to said source, and means for periodically reciprocating said plunger.

14. In combination in a feeder for plastic material such as molten glass, a source for such material, a passage having a material delivery orifice and a vent port formed therein, a pump between said source and said passage, a chamber communicating with said passage and aligned with said orifice, alternately acting means for drawing material into said chamber and for expelling material from said chamber back into said passage, means for varying the operation of said means during the operation of the feeder, an adjustable valve for controlling said port, means for adjusting said valve during the operation of the feeder, a motor for driving said pump and means for varying the speed of said pump.

15. A method of feeding plastic material such as molten glass in the form of a succession of separately formed mold charges, which consists in creating a continuous forced flow of material toward and through a delivery orifice in the form of a confined stream, alternately accumulating a mass of such material from said stream as it moves toward said orifice and forcing material from said mass through said orifice, regulating the resultant flow through said orifice by periodically partially venting said stream and severing the stream issuing from the orifice at a point adjacent but below said orifice.

16. A feeder for plastic material such as molten glass, comprising a source of such material, a passage terminating in a continuously open delivery orifice and having a chamber communicating therewith, a pump receiving material from said source and continuously forcing the same into said passage, means for alternately reducing and increasing the fluid pressure within said chamber, means for diverting a portion of the glass away from said orifice and returning it to said source and means for periodically severing the stream of material issuing from said orifice.

17. A feeder for plastic material such as molten glass, comprising a source of such material, a passage terminating in a continuously open delivery orifice and having a chamber communicating therewith and with said orifice, a continuously acting pump for forcing material from said source into said passage, and through said orifice, means for periodically varying the rate of flow through said orifice, means for periodically subjecting the interior of said chamber to an expelling fluid pressure, and means located below said orifice for severing the stream issuing therefrom in timed relation with said periodically acting means.

18. A feeder for molten glass comprising a forehearth for molten glass having a glass conducting passage formed therein and leading to a delivery orifice, means for drawing glass from said forehearth and forcing it under pressure through said passage and toward and through said delivery orifice, means for periodically venting said passage to vary the pressure on the glass therein and produce a pulsating flow through said orifice, and means for severing the resultant flow through said orifice into individual mold charges.

19. A feeder for molten glass comprising a forehearth for molten glass having a glass conducting passage formed therein and leading to a delivery orifice, means for drawing glass from said forehearth and forcing it under pressure through said passage and toward and through said delivery orifice, means for periodically varying the pressure of the glass in said passage, means for subjecting the glass above the orifice to a periodically varying expelling force, and means for severing the resultant flow through said orifice into individual mold charges.

20. A method of feeding molten glass and a supply body of such material which consists in establishing a flow from said body toward and through an orifice and maintaining such flow under a constant pressure, subjecting the glass over the orifice to a variable expelling force to control the flow through the orifice and varying the composite effect of said expelling forces by diverting a regulatable amount of glass away from the orifice and returning it into said body.

21. A glass feeder comprising a forehearth having a passage therein leading to a delivery orifice, a continuously acting pump for forcing molten glass through said passage to establish a continuously flowing stream through said orifice, means for applying a periodically varied expelling force to the glass over said orifice to alternately increase and decrease the diameter of said stream, and means for diverting a regulatable amount of glass away from said orifice to vary the composite effect of said pump and said last mentioned means and regulating the discharge through said orifice.

22. A feeder for plastic material such as molten glass comprising a forehearth having a passage therein leading to a delivery orifice, a continuously acting pump in said passage, a chamber communicating with said orifice and said passage, means for periodically varying the pressure in said chamber to vary the diameter of the stream flowing through said orifice, a vent port establishing communication between said chamber and said forehearth, and means for varying the effective size of said vent port.

23. A feeder for plastic material such as molten glass comprising a forehearth having a passage therein leading to a delivery orifice, a continuously acting pump in said passage, a chamber communicating with said orifice, means for alternately connecting said chamber to sources of super and sub-atmospheric pressures, a vent port establishing communication between said chamber and said forehearth, and a reciprocating member for varying the effective size of said vent port.

24. A feeder for plastic material such as molten glass comprising a forehearth having a passage therein leading to a delivery orifice, a continuously acting pump in said passage, a chamber communicating with said passage and said orifice, a plunger within said chamber and aligned with said orifice, means for periodically reciprocating said plunger, a vent port establishing communication between said chamber and said forehearth, and means for varying the effective size of said vent port.

25. A feeder for plastic material such as molten glass comprising a forehearth having a passage therein leading to a delivery orifice, a continuously acting pump in said passage, a chamber communicating with said orifice, a plunger in said chamber and aligned with said orifice, means for reciprocating said plunger, a vent port establishing communication between said chamber and said forehearth, a member for controlling the effective size of said vent port, and means for reciprocating said member.

FRANK L. O. WADSWORTH.

CERTIFICATE OF CORRECTION.

Patent No. 2,124,092.                        July 19, 1938.

FRANK L. O. WADSWORTH.

It is hereby certified that error appears in the printed specification of the above numbered patent requiring correction as follows: Page 6, second column, line 7, claim 3, after the word "away" insert from; and that the said Letters Patent should be read with this correction therein that the same may conform to the record of the case in the Patent Office.

Signed and sealed this 30th day of August, A. D. 1938.

Henry Van Arsdale (Seal)                               Acting Commissioner of Patents.